US009262139B2

(12) United States Patent
Howes et al.

(10) Patent No.: US 9,262,139 B2
(45) Date of Patent: Feb. 16, 2016

(54) LAYERED PROGRAMMING FOR HETEROGENEOUS DEVICES

(71) Applicant: Advanced Micro Devices, Inc., Sunnyvale, CA (US)

(72) Inventors: Lee W. Howes, San Jose, CA (US); Dongping Zhang, San Jose, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 263 days.

(21) Appl. No.: 13/735,579

(22) Filed: Jan. 7, 2013

(65) Prior Publication Data

US 2014/0196016 A1 Jul. 10, 2014

(51) Int. Cl.
G06F 9/45 (2006.01)
G06F 9/455 (2006.01)

(52) U.S. Cl.
CPC .............. *G06F 8/443* (2013.01); *G06F 8/452* (2013.01); *G06F 9/45516* (2013.01)

(58) Field of Classification Search
None
See application file for complete search history.

(56) References Cited

U.S. PATENT DOCUMENTS

| 7,228,531 | B1* | 6/2007 | Langhammer ................. 717/146 |
| 2003/0065888 | A1* | 4/2003 | Nishiyama .......... G06F 9/30047 711/137 |
| 2004/0010679 | A1* | 1/2004 | Moritz et al. ..................... 713/1 |
| 2006/0277529 | A1* | 12/2006 | Michimoto ........... G06F 8/4452 717/136 |
| 2007/0169057 | A1* | 7/2007 | Silvera et al. .................. 717/160 |
| 2007/0169059 | A1* | 7/2007 | Halambi ............... G06F 8/4452 717/160 |
| 2010/0205589 | A1* | 8/2010 | Biggerstaff ............... G06F 8/43 717/150 |
| 2010/0235611 | A1* | 9/2010 | Yamashita ............ G06F 8/4432 712/220 |
| 2011/0265067 | A1* | 10/2011 | Schulte et al. ................. 717/148 |
| 2012/0079467 | A1* | 3/2012 | Tojo et al. ...................... 717/150 |
| 2012/0117552 | A1* | 5/2012 | Krishnaiyer et al. ......... 717/160 |
| 2012/0167069 | A1* | 6/2012 | Lin ....................... G06F 8/4441 717/160 |
| 2013/0198494 | A1* | 8/2013 | Grover et al. .................. 712/226 |

OTHER PUBLICATIONS

Girbal, Sylvain, et al. "Semi-automatic composition of loop transformations for deep parallelism and memory hierarchies." International Journal of Parallel Programming 34.3 (2006): 261-317. Retrieved on [Sep. 24, 2015] Retrieved from the Internet: URL<http://link.springer.com/article/10.1007/s10766-006-0012-3>.*

(Continued)

*Primary Examiner* — Thuy Dao
*Assistant Examiner* — Cheneca Smith
(74) *Attorney, Agent, or Firm* — Volpe and Koenig, P.C.

(57) ABSTRACT

A method, a system, and a non-transitory computer readable medium for parallelizing computer program code including a loop are presented. An intermediate language version of the computer program code is generated based on a parallel type of the loop, wherein the intermediate language version includes information about parallelism in the computer program code. The intermediate language version is optimized at runtime based on the device characteristics where the computer program code is to be executed. The parallel type may include a thread parallel type, wherein the loop is dispatched to multiple threads for execution, or a general parallel type, wherein the loop is dispatched to a single thread and may be vectorized for execution. The intermediate language version may be saved separate from the computer program code.

7 Claims, 3 Drawing Sheets

(56) References Cited

OTHER PUBLICATIONS

Bondhugula et al. "PLuTo: A practical and fully automatic polyhedral program optimization system." Proceedings of the ACM SIGPLAN Conference on Programming Language Design and Implementation (Jun. 2008). Retrieved on [Sep. 24, 2015] Retrieved from the Internet: URL<http://citeseerx.ist.psu.edu/viewdoc/download?doi=10.1.1.151.2361&rep=rep1&type=pdf>.*
Intel SPMD Program Complier User's Guide, http://ispc.github.com/ispc.html, 2011-2012.
The OpenACC Execution Model, Dr. Dobb's, The OpenACC Execution Model, http://www.drdobbs.com/parallel/the-openacc-execution-model/240006334, Aug. 27, 2012.

* cited by examiner

LAYERED PROGRAMMING FOR HETEROGENEOUS DEVICES

TECHNICAL FIELD

The disclosed embodiments are generally directed to programming for heterogeneous devices, and in particular, to generating an intermediate representation of program code to enable further optimization at runtime based on underlying device characteristics.

BACKGROUND

Current general purpose computation on a graphics processing unit (GPGPU) programming models define a grouping concept which leads to poorly scoped local/shared memory regions and an inconvenient approach to projecting complicated iterations spaces. These models have inherited CUDA™'s group-based programming model that stems largely from the way graphics architectures were designed. These models explicitly launch groups of "work items" (sometimes known as "threads") that define a fairly static mapping to the architecture. The work items within a single group can communicate with each other, applying synchronization primitives and memory structures that are scoped to logical group constructs.

Mapping complex iteration spaces to this sort of grouped launch directly imposes a loss of information. For example, mapping a 15×15×15 region into 64 work items will work well on specific hardware. But remapping that region onto a different number of work items means re-inferring certain inter-work item communication which is likely to be harder than the initial work to parallelize the loop. In addition, projections like this are not clean for the programmer, and it is difficult to understand the scoping of local memory that is not visible in any sort of lexical scope.

Current programming models for vector and multi-core architectures, which mostly use standard C programming, rely on a relatively compiler-driven approach, such that the compiler infers all of the parallelism for the loops, both for the vectorization and for the thread parallelism.

OpenMP® allows a programmer to access the thread parallelism, but expects the compiler to infer vector parallelism from it. There is little in an OpenMP® loop that identifies a portion of the loop as vectorizable. There is little control over the loop nest to indicate which portions should be vectorizable and should be run under a particular thread. For efficiency, there might be cases where a programmer would want this level of control. For example, when iterating over a fixed-size block of data.

Intel®'s Single Program, Multiple Data (SPMD) compiler tries to map vector programming onto the CPU and solves some of the cleanliness problems with OpenCL™, etc. Intel®'s SPMD program compiler (ISPC) moves in this direction. It has the notion of a SPMD entry point, within which the programmer may write code that is explicitly SPMD. Or the programmer may write code with "for each" blocks that describe code that can be run in parallel, but does not need to be run in threads, indicating that the code should be run in parallel in some way.

OpenACC® exposes these layers by providing hints to the compiler (like an extension to OpenMP®). These hints may include hints to parallelize a given loop, or map a loop to vectors. These hints are a sequence of tuning parameters, rather than strict control over the layers. OpenACC® still relies on the compiler doing the work, but the compiler could fail to vectorize the code in the desired way.

SUMMARY OF EMBODIMENTS

Some embodiments provide a method for parallelizing computer program code, the computer program code including a loop. An intermediate language version of the computer program code is generated based on a parallel type for the loop, wherein the intermediate language version includes information about parallelism in the computer program code. The intermediate language version is optimized at runtime based on the device characteristics where the computer program code is to be executed. The parallel type may include a thread parallel type, wherein the loop is dispatched to multiple threads for execution, or a general parallel type, wherein the loop is dispatched to a single thread and may be vectorized for execution. The intermediate language version may be saved separate from the computer program code.

Some embodiments provide a system for parallelizing computer program code, the computer program code including a loop. The system includes a processor and a compiler running on the processor. The compiler is configured to generate an intermediate language version of the computer program code based on a parallel type for the loop, wherein the intermediate language version includes information about parallelism in the computer program code. The compiler is also configured to optimize the intermediate language version at runtime based on the device characteristics where the computer program code is to be executed.

Some embodiments provide a non-transitory computer-readable storage medium storing a set of instructions for execution by a general purpose computer to parallelize computer program code, the computer program code including a loop. A generating code segment generates an intermediate language version of the computer program code based on a parallel type for the loop, wherein the intermediate language version includes information about parallelism in the computer program code. An optimizing code segment optimizes the intermediate language version at runtime based on the device characteristics where the computer program code is to be executed.

BRIEF DESCRIPTION OF THE DRAWINGS

A more detailed understanding may be had from the following description, given by way of example in conjunction with the accompanying drawings, wherein.

DETAILED DESCRIPTION

A method, a system, and a non-transitory computer readable medium for parallelizing computer program code, the computer program code including a loop, are presented. The computer program code specifies whether the loop is parallel (for example, that the loop is parallelizable) and a parallel type for the loop (for example, the type of parallelism for the loop). An intermediate language version of the computer program code is generated based on the parallel type for the loop. The intermediate language version is optimized at runtime based on the device characteristics where the computer program code is to be executed. The parallel type may include a thread parallel type, wherein the loop is dispatched to multiple threads for execution, or a general parallel type (for example, to indicate that the loop is parallel but not thread parallel), wherein the loop is dispatched to a single thread and may be vectorized for execution. The intermediate language version may be saved separate from the computer program code.

Figure 1:
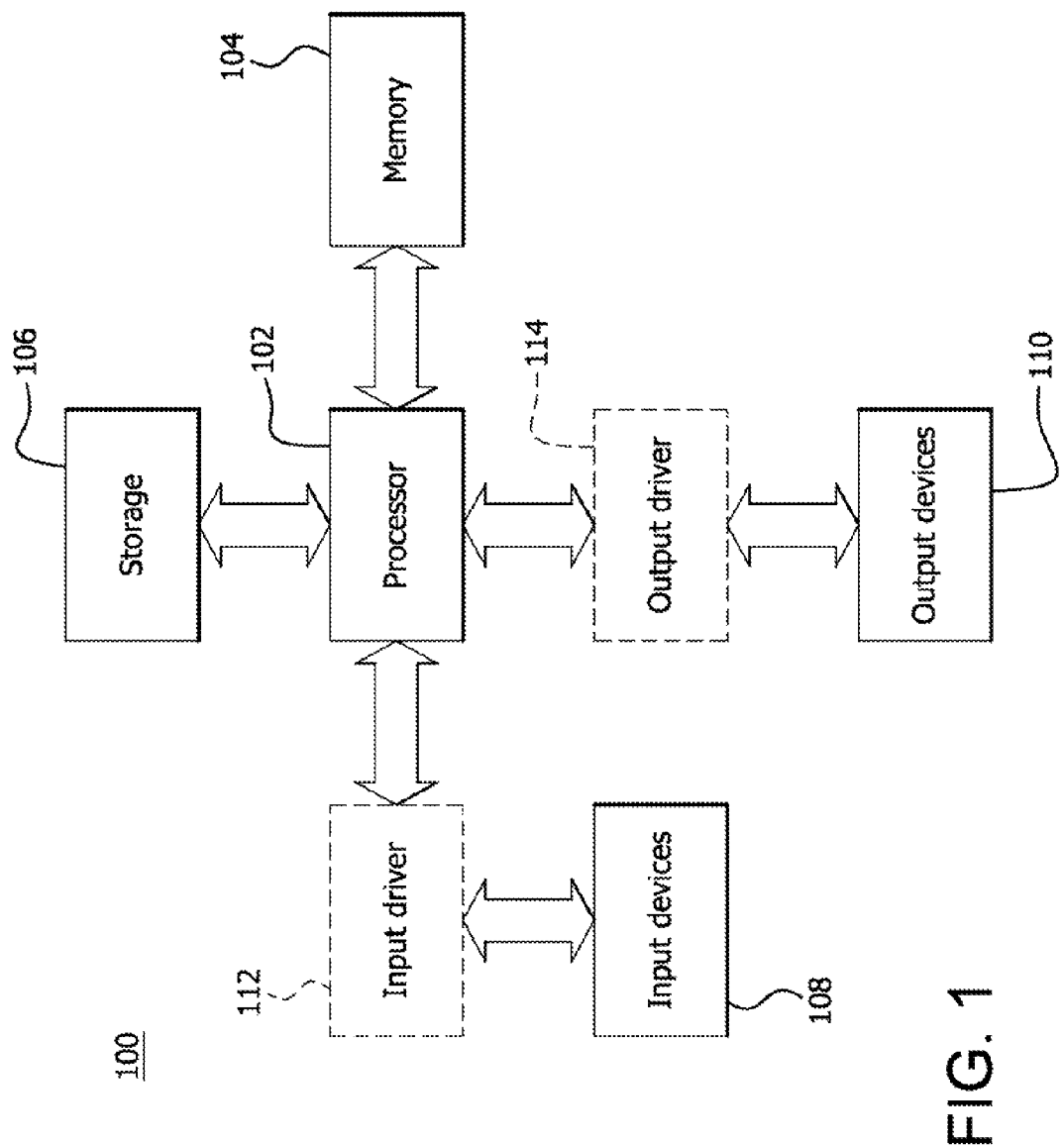
FIG. 1 is a block diagram of an example device in which one or more disclosed embodiments may be implemented, according to some embodiments.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
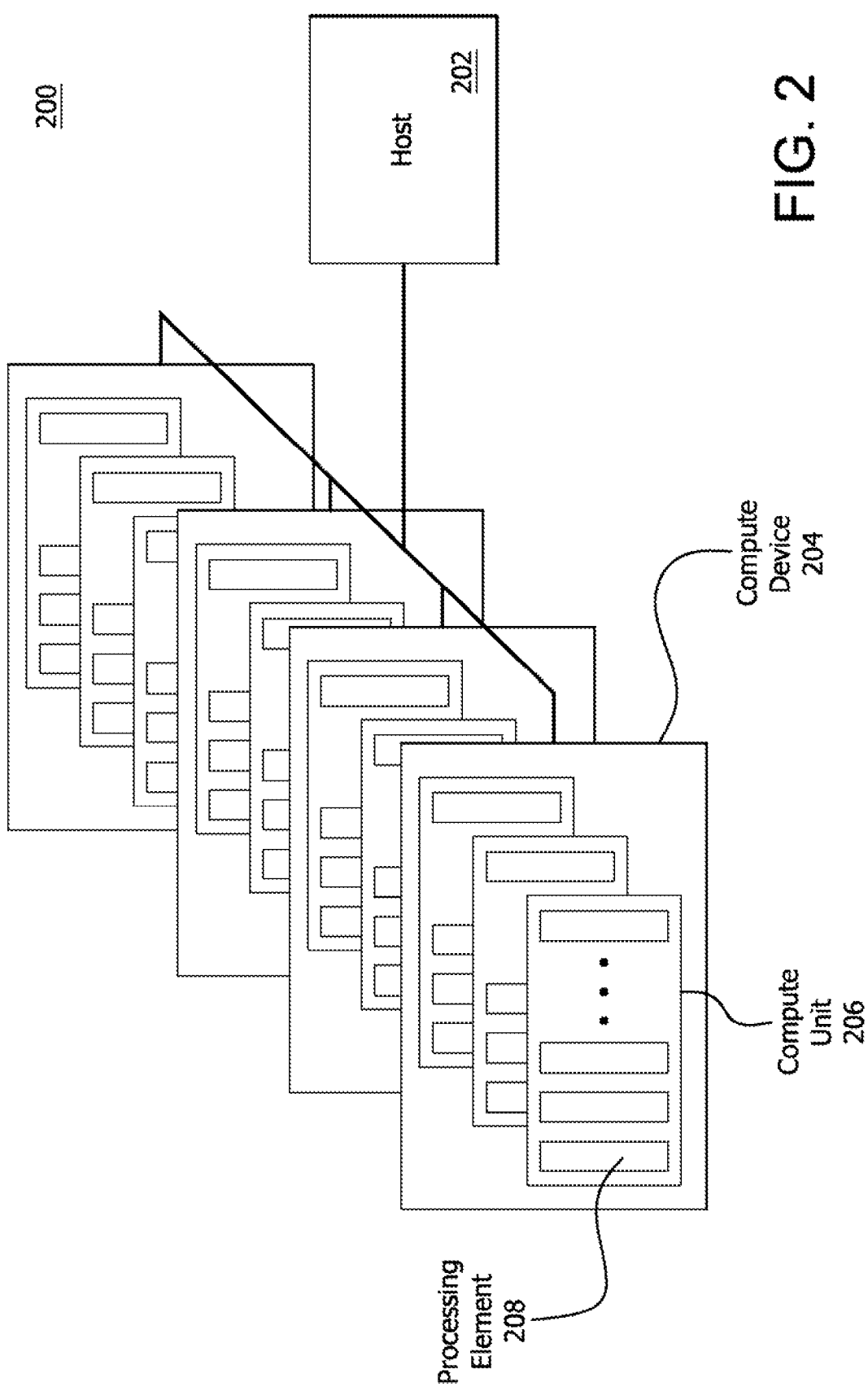
FIG. 2 is a block diagram of an exemplary heterogeneous computing system, according to some embodiments.

FIG. 2 is a block diagram of an exemplary heterogeneous computing system 200; in this example, the computing system 200 is an OpenCL™ modeled system. It is noted that the embodiments described herein may operate on any heterogeneous computing system, and are not limited to an OpenCL™ system model. The computing system 200 includes a host 202 which communicates with one or more compute devices 204. Each compute device 204 includes one or more compute units 206, and each compute unit 206 includes one or more processing elements 208. It is understood that the computing system 200 may include any number of compute devices 204, compute units 206, and processing elements 208.

Some embodiments propose a simpler programming model, with a mapping that leads to easier projection and more convenient mapping of the same algorithm to both central processing unit (CPU) and graphics processing unit (GPU) vector architectures. For example, with OpenCL™, this produces code that is runtime compiled or at least portable.

This model describes the algorithm in a layered way, so that the programmer indicates which layers are parallel. For example, with an image processing code, the programmer indicates that the code is parallel over the set of macroblocks, and within each macroblock, that the code is parallel over the pixels. But there is a serial layer in-between the two parallel layers that runs per macroblock, but not per pixel. So within the serial layer, a separate parallelization is performed. This model provides a better granularity of what the programmer want to run in parallel, instead of deferring to the compiler to create the parallel code.

It is desirable to maintain this information as late as possible during compilation. At runtime, when the device details are known (for example, vector width, number of cores, how much memory it has, etc.), the final mapping to the vector operations is performed. An intermediate layer retains this information. Then the compiler optimizes the intermediate layer based on the device where the code is run.

This model relies on the code generation phase of the compiler, but not necessarily on the analysis phase. The code generation is deferred to runtime, where the compiler has the information necessary to perform the vectorization. This is in contrast to current intermediate languages, which are purely SPMD. In pure SPMD, the compiler needs to extract the "scalar-ness" out of the code, and then regenerate both the scalar and parallel aspects of the code, which are difficult compiler jobs. This is the current OpenCL™ problem.

The programming model described herein presents a system of representations of programs that abstracts threads from in-thread data-parallelism. This representation is defined and may be supported at the source code level, or at the intermediate language level, with similar benefits in each case. This approach enables a cleaner mapping of data-parallel programming concepts to combined heavily threaded and vector architectures than has previously been possible. Common programming models of the past targeted vector programming, and modern SPMD models such as OpenCL™ target an abstract concept of threading that also attempts to map to the vectors. A layered model implementable both in high level languages and intermediate representations is proposed to map with more portable performance to various architectures.

Instead of attempting to map complicated blocked execution spaces to the GPU, a clean abstract model is proposed. Loop nests are programmed with a structure such that there is an outer thread/task parallel loop which may be derived from: a loop, a library call over a lambda, a task parallel runtime like Threaded Building Blocks (TBB), or similar. Within that loop, a lexically scoped entity defines the scope for communication memory and within which scalar/vector code is to execute.

An abstract work separation is proposed such that various high-level languages may separate a rich per-thread but heavily multi-threaded scalar execution flow from code blocks that are explicitly data-parallel. The code blocks may be stored in an intermediate representation for performance-portable mapping to scalar or SIMD architectures. Data parallelism should not be mapped explicitly to SIMD lanes, and to threads as little as possible, but rather be maintained abstractly. SIMD lanes should be an implementation detail.

Inside that blocked entity, concepts of vectorizability may be defined—that is, loops that the programmer can strictly define as vectorizable. These may be represented as: loops with attributes, library calls that map smaller lambdas, or anything similar. While the outer loop is expected to behave as a set of true threads, there should be no such expectation of vectorizable inner loops, but that communication can still occur at a vector level. It is the compiler's job to map those inner iteration spaces to vectors and memory visibility is defined as being encapsulated at the outer loop level.

For example, a loop nest may be defined as follows:

```
for( threads in grid of threads ):
    thread-local memory declaration;
    scalar code;
    scalar code;
    _attribute_(parallel)
    for( i in range(15, 15, 15 ):
        perform locally parallel operation
    scalar code;
    scalar code;
    _attribute_(parallel)
    for( i in range(15, 15, 15 ):
        perform locally parallel operation
```

The first "for i in range" loop in this loop nest is supposed to be parallel, but it is difficult to notate as such in some languages. In OpenCL™, for example, the programmer would need to put thread-local memory declarations within this innermost loop. The scoping of these declarations becomes confusing because it is not clear which loop iteration owns the data, because it is not clear at what level of the loop nest the memory is being allocated. In OpenCL™, the inner for loop and the outer for loop would be simultaneously parallel in one dispatch. But the lexical scope of the memory allocation would not necessarily match the theoretical scope of the memory allocation.

The scope of the memory allocation needs to be more explicit, to parallelize the level that handles the memory allocation and within that scope, parallelize the level that handles the vectorization that makes use of that memory. For example, on a GPU, there are shared memory regions (called local memory in OpenCL™), which are allocated on a per-work group basis. But a work group is a part of a larger dispatch. Writing code to allocate that local memory is written in the work item, but a large number of work items within a work group could be running. Such a memory allocation does not fit well within the hierarchy. If code could be written such that:

```
for each work group
    first, allocate memory
    then, perform some scalar operations on the memory (being explicit about
        the scalar code instead of trying to infer it from parallel code)
    within the flow of the scalar code, start a parallel block
    within the parallel block, execute on each parallel execution unit, all
        having access to the allocated memory
```

The present programming model multiple of these parallel blocks with scalar code interleaved between them. This cannot be done in OpenCL™, because once the code starts being fully parallel, it is fully parallel to the end. Within this programming mode, the parallel blocks are like "mini-dispatches" within the thread dispatch and describe something that is going to execute in parallel on a core, but does not have to actually dispatch work and have any latency involved. All of this code executes on the same core; portions of it are parallel and portions of it are not.

The inner range loops are parallel, but are not expected to launch multiple threads, thus removing the need to consider synchronization. The inner range loops may be vectorized relatively simply by a compiler due to the programmer hints.

Another example is a basic motion-vector search code as might be compiled for OpenMP®:

```
#omp parallel for
for( int y = 0; y < YMax; ++y ){ // for each macroblock in Y
    #omp parallel for
    for( int x = 0; x < XMax; ++x ) { // for each macroblock in X
        while( not found optimal match ) {
            // Do something to choose next test region - serial heuristic
            // Compute tx, ty as coordinates of match region
            for( int y2 = 0; y2 < 16; ++y2 ) {
                for( int x2 = 0; x2 < 16; ++x2 ) {
                    diff = block(x2 +16xx, y2 + 6xy) – target(x2 + tx, y2 + ty);
                    // use diff... maybe sum of squared differences
                }
            }
        }
    }
}
```

This code includes a serial while loop with unknown bounds (because it is unknown when it will terminate) with parallel inner for loops. Under existing systems, the programmer has to hope that the compiler parallelizes the two inner for loops. It becomes difficult to write this code in OpenCL™ in a way that is comprehensible, and more importantly, in a way that can be efficiently compiled at runtime.

The while loop needs to become parallel because it will run in every work item. This means that at some point, the while loop will be exited, but the termination condition will have to be inferred in parallel, and the programmer has to hope that the compiler can tell that the termination condition is uniform. Otherwise, the code will be inefficient, with communication required between work items to determine whether the termination condition has been reached. The sums of differences can be calculated in parallel, but the code that tests the sums may be serial. It might not be obvious to the compiler at what level the serialization becomes true.

In the above example, there are two OpenMP® parallel for loops, and the OpenMP® runtime is expected to map the parallel for loops to threads. Mapping the inner for loops to threads does not make sense, but there is a clear serial while loop in this code. To attempt to map the while loop into a set of parallel work items, the y2 for loop and the while loop need to be exchanged. But the y2 for loop alone does not include enough work items to fill a wavefront. So on an AMD® architecture, for example, it would be necessary to exchange the y2 for loop and the while loop and add an x3 for loop, so that there is an outer x2 for loop and an inner x3 for loop with the while loop in between. The entire structure is then wrapped in a kernel, and relies on a runtime dispatch to handle the outer for loops.

```
for( int y2 = 0; y2 < 16; ++y2 ) {
    for( int x2 = 0; x2 < 16; x2 += 4 ) {
        while( not found optimal match ) {
            for( int x3 = x2; x3 < x2 + 4; x3 ++ ) {
                diff = block(x2 + 16xx, y2 +16xy) – target(x2 + tx, y2 + ty);
                // use diff... maybe sum of squared differences
            }
        }
    }
}
```

Using the same example in OpenCL™, there would be four levels of dispatch, and the scalar while loop would not be visible in the OpenCL™ parallel dispatch. To make the while loop parallel, it would, for example, have to be pushed into the middle of the code. The while loop looks serial, but it is executing in every work item, and is therefore inherently parallel. So the code may have to be transformed to achieve the desired parallel result, which would be a difficult task. The compiler would then have to undo the code transformation to achieve better performance.

The resulting OpenCL™/Heterogeneous System Architecture (HSA) kernel would be:

```
kernel(...)
{
    while( not found optimal match ) {
        for( int x3 = x2; x3 < x2 + 4; x3 ++ ) {
            diff = block(x2 + 16×x, y2 + 16×y) - target(x2 + tx, y2 + ty);
            // use diff... maybe sum of squared differences
        }
    }
}
```

The outer for loops are now outside of the kernel as part of the dispatch. There are four dimensions outside the kernel, then the while loop, and then a dimension (the x3 for loop) inside the kernel. This structure results because of the way the loops have to be transformed.

The kernel dispatch would include:

```
for( int y = 0; y < YMax; ++y ){
    for( int x = 0; x < XMax; ++x ) {
        for( int y2 = 0; y2 < 16; ++y2 ) {
            for( int x2 = 0; x2 < 16; x2 += 4 ) {
``` in one dispatch, which is not easy to understand. If there is also local data, the kernel will be something like:

```
kernel(...)
{
    local data[...];
    while( not found optimal match ) {
        for( int x3 = x2; x3 < x2 + 4; x3 ++ ) {
            diff = block(x2 + 16×x, y2 + 16×y) - target(x2 + tx, y2 + ty);
            // use diff... maybe sum of squared differences
        }
    }
}
```

If there is local data, it is not obvious which loop owns the local data. With multiple outer dimensions before entering the kernel, ownership becomes even more confusing. The same local data is shared across the inner pair of dimensions. The scope of that local data applies to a set of kernel instances for the group.

The resulting code transformation is messy to read and is relatively architecture-specific. In some embodiments, a representation would be what is actually desired, such as:

```
parallelFor( int y = 0; y < YMax; ++y ){// for each macroblock in Y
    _attribute (thread_ parallel)
    parallelFor ( int x = 0; x < XMax; ++x ) {// for each macroblock in X
        local data[...]; // this local data is now lexically scoped to match its
            meaning
        while( not found optimal match ) {
            // Do something to choose next test region - serial heuristic
            // Compute tx, ty as coordinates of match region
            _attribute(parallel)
            for( int y2 = 0; y2 < 16; ++y2 ) {
                _attribute(parallel)
                for( int x2 = 0; x2 < 16; ++x2 ) {
                    diff = block(x2 + 16×x, y2 + 16×y) - target(x2 + tx, y2 + ty);
                    // use diff... maybe sum of squared differences
                }
            }
        }
    }
}
```

This code example includes two thread parallel loops, and then has the local data for each of those loops. Next is the while loop (a scalar loop), and then two more parallel loops. But the two parallel loops inside the while loop are not thread parallel loops; they can run in a single thread and be vectorized.

In this example, the_attribute(thread_parallel) parameter indicates that the following loop should be run as a thread parallel loop. The two_attribute(parallel) parameters indicate that the following loop should be run in parallel, but need not be thread parallel. For example, the loop can be vectorized.

Providing more details than this regarding how to parallelize each loop may not be beneficial, because doing so may lock the code into the hardware, which might not be known until runtime. An intermediate language (IL) representation is generated from this structure, which the compiler could then optimize at runtime based on the device properties. After generation, the IL representation may optionally be saved separate from the source code.

The IL representation contains information about the loops. For example, if the source code includes some sort of parallel loop with a vector loop inside the parallel loop, then the IL representation would also wrap that information. In one implementation, the IL representation includes a tree of parallel execution semantics, not of syntax. When the tree is optimized, it is optimized knowing what parallelism was present in the original code. When the IL representation is mapped to the device, information about the parallelism of the code can be combined with information about the parallelism of the device. In this way, the IL representation supports a wide range of possible optimizations.

The inner loops are now marked as parallel, and hence vectorizable. The outer loops are launched using pure library calls and the local scoped data can be put back in. The inner loops can now be mapped down to the appropriate vector size and loop nest to cover that region without undoing the transformation that the programmer had to make to map to OpenCL™ or CUDA™.

One aspect of this approach is embedding the information in the IL representation. If an IL representation is generated that has one scalar thread and the high level representation is carried through into the IL such that data parallel sections are stored that way, this can be lowered to vector or scalar ILs and indirectly to vector or scalar instruction set architectures (ISAs) in various ways, aiming for some degree of performance portability.

The execution should be able to be described to abstract away a long-running large data-parallel loop, such that a work dispatch is thread-oriented, and not abstract size-oriented. Yield operations may be used to make that efficient.

Figure 3:
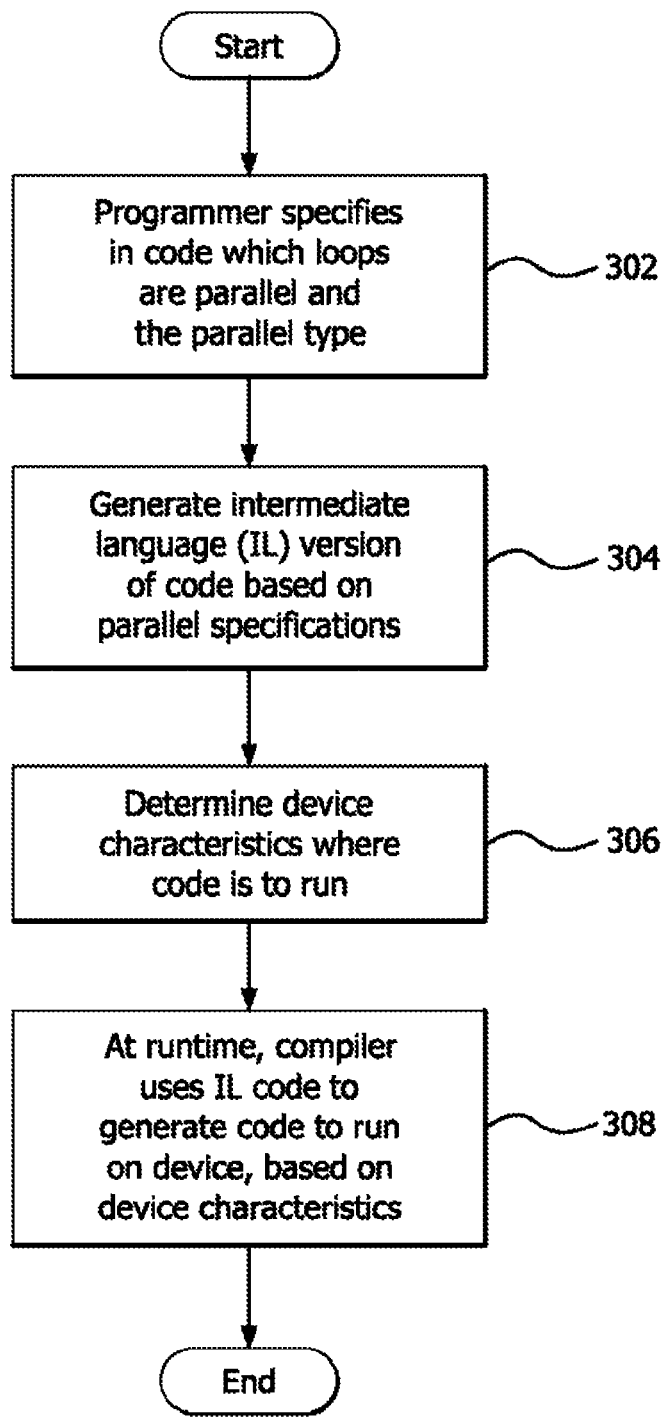
FIG. 3 is a flowchart of a method for specifying the parallelization of program code, according to some embodiments.

FIG. 3 is a flowchart of a method 300 for specifying the parallelization of program code. The programmer specifies in the code which loops are parallel, and the type of parallel loop (for example, thread parallel or vectorizable parallel; step 302). The compiler generates an intermediate language (IL) version of the program code based on the parallel specifications made by the programmer (step 304). After generation, the IL representation may optionally be saved separate from the source code (not shown in FIG. 3). The system determines the device characteristics where the program code is to run (step 306). At runtime, the compiler uses the IL code to generate the program code to be run on the device, based on the device characteristics (step 308) and the method terminates.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for parallelizing computer program code, the computer program code including a loop, an indication of whether the loop is parallel, and a parallel type for the loop, the method comprising:
    generating an intermediate language version of the computer program code based on the parallel type for the loop, wherein the intermediate language version includes information about parallelism in the computer program code, including whether the parallel type is a vectorizable parallel type or a thread parallel type;
    optimizing the intermediate language version of the computer program code at runtime based on device characteristics where the computer program code is to be executed; and
    dispatching the loop to multiple threads for execution if the parallel type is thread parallel, or vectorizing the loop for execution on a single thread if the thread type is vectorizable parallel.

2. The method according to claim 1, further comprising:
    saving the intermediate language version of the computer program code separate from the computer program code.

3. A system for parallelizing computer program code, the computer program code including a loop, an indication of whether the loop is parallel, and a parallel type for the loop, the system comprising:
    a processor; and
    a compiler running on the processor, the compiler configured to:
        generate an intermediate language version of the computer program code based on the parallel type for the loop, wherein the intermediate language version includes information about parallelism in the computer program code, including whether the parallel type is a vectorizable parallel type or a thread parallel type;
        optimize the intermediate language version of the computer program code at runtime based on device characteristics where the computer program code is to be executed; and
    dispatch the loop to multiple threads for execution if the parallel type is thread parallel, or vectorize the loop for execution on a single thread if the thread type is vectorizable parallel.

4. The system according to claim 3, wherein the compiler is further configured to:
    save the intermediate language version of the computer program code separate from the computer program code.

5. A non-transitory computer-readable storage medium storing a set of instructions for execution by a general purpose computer to parallelize computer program code, the computer program code including a loop, an indication of whether the loop is parallel, and a parallel type for the loop, the set of instructions comprising:
    a generating code segment for generating an intermediate language version of the computer program code based on the parallel type for the loop, wherein the intermediate language version includes information about parallelism in the computer program code, including whether the parallel type is a vectorizable parallel type or a thread parallel type;
    an optimizing code segment for optimizing the intermediate language version of the computer program code at runtime based on device characteristics where the computer program code is to be executed; and
    a dispatching code segment for dispatching the loop to multiple threads for execution if the parallel type is thread parallel, or vectorizing the loop for execution on a single thread if the thread type is vectorizable parallel.

6. The non-transitory computer-readable storage medium according to claim 5, further comprising:
    a saving code segment for saving the intermediate language version of the computer program code separate from the computer program code.

7. The non-transitory computer-readable storage medium according to claim 5, wherein the set of instructions are hardware description language (HDL) instructions used for the manufacture of a device.

* * * * *